US008912893B2

(12) United States Patent
Bullmore

(10) Patent No.: US 8,912,893 B2
(45) Date of Patent: *Dec. 16, 2014

(54) CIRCUIT MONITORING DEVICE

(75) Inventor: Eric Bullmore, Werribee (AU)

(73) Assignee: Tessler Research Pty Ltd, Victoria (AU)

(*) Notice: Subject to any disclaimer, the term of this patent is extended or adjusted under 35 U.S.C. 154(b) by 1029 days.

This patent is subject to a terminal disclaimer.

(21) Appl. No.: 12/894,257

(22) Filed: Sep. 30, 2010

(65) Prior Publication Data

US 2011/0234401 A1 Sep. 29, 2011

Related U.S. Application Data

(63) Continuation of application No. 11/777,939, filed on Jul. 13, 2007, now Pat. No. 7,834,744, which is a continuation of application No. 10/433,877, filed as application No. PCT/AU01/01566 on Dec. 3, 2001, now Pat. No. 7,256,683.

(30) Foreign Application Priority Data

Dec. 4, 2000 (AU) ...................................... PR1878

(51) Int. Cl.

| | |
|---|---|
| ***F21V 7/04*** | (2006.01) |
| ***G08B 9/00*** | (2006.01) |
| ***H02J 13/00*** | (2006.01) |
| ***G08B 25/01*** | (2006.01) |
| ***G08B 23/00*** | (2006.01) |
| ***G08B 13/22*** | (2006.01) |
| ***G08B 17/10*** | (2006.01) |
| ***G08B 25/14*** | (2006.01) |
| ***G08B 29/22*** | (2006.01) |

(52) U.S. Cl.
CPC .............. *G08B 23/00* (2013.01); *G08B 25/018* (2013.01); *G08B 13/22* (2013.01); *G08B 17/10* (2013.01); *G08B 25/14* (2013.01); *G08B 29/22* (2013.01)
USPC ............ 340/286.02; 340/9.1; 361/31; 361/95

(58) Field of Classification Search
None
See application file for complete search history.

(56) References Cited

U.S. PATENT DOCUMENTS

| | | | | | |
|---|---|---|---|---|---|
| 3,346,846 | A | * | 10/1967 | Ferguson et al. | 340/13.37 |
| 4,065,721 | A | * | 12/1977 | Rabe | 327/509 |
| 4,464,651 | A | | 8/1984 | Duhame | |
| 4,571,659 | A | * | 2/1986 | Demeyer et al. | 361/95 |
| 4,752,698 | A | | 6/1988 | Furuyama et al. | |
| 4,857,912 | A | | 8/1989 | Everett et al. | |
| 5,420,571 | A | * | 5/1995 | Coleman et al. | 340/644 |
| 5,444,431 | A | * | 8/1995 | Kenny | 340/541 |
| 5,754,103 | A | | 5/1998 | Kanai et al. | |
| 5,764,142 | A | | 6/1998 | Anderson et al. | |
| 5,895,445 | A | * | 4/1999 | Hong et al. | 702/182 |
| 6,034,601 | A | * | 3/2000 | Barrieau et al. | 340/514 |
| 6,118,373 | A | | 9/2000 | Mandry | |
| 6,188,321 | B1 | * | 2/2001 | Horstkotte et al. | 340/660 |
| 6,327,124 | B1 | * | 12/2001 | Fearing et al. | 361/31 |

(Continued)

*Primary Examiner* — George Bugg
*Assistant Examiner* — Renee Dorsey
(74) *Attorney, Agent, or Firm* — Leason Ellis LLP

(57) ABSTRACT

The circuit monitoring device is disclosed. The device is for monitoring circuit resistance. At configurable thresholds digital flags are triggered, the device can be used as a Security/Building management system. The device uses open technology is fully scaleable and allows programmable logic controllers to be used as security management systems. Using a soft logic option a PC could take the place of the PLC.

39 Claims, 7 Drawing Sheets

(56) References Cited

U.S. PATENT DOCUMENTS

| | | | | |
|---|---|---|---|---|
| 6,353,393 | B1 | 3/2002 | Nylander | |
| 6,496,342 | B1 * | 12/2002 | Horvath et al. | 361/65 |
| 6,664,894 | B2 | 12/2003 | Pakhomov | |
| 7,256,683 | B2 | 8/2007 | Bullmore | |
| 7,834,744 | B2 | 11/2010 | Bullmore | |

* cited by examiner

CIRCUIT MONITORING DEVICE

This application is a continuation of U.S. patent application Ser. No. 11/777,939 filed Jul. 13, 2007 now U.S. Pat. No. 7,834,744, which is a continuation of U.S. patent application Ser. No. 10/433,877, filed on Jun. 3, 2003, now U.S. Pat. No. 7,256,683, which is the national phase under 35 U.S.C. §371 of PCT/AU01/01566, filed Dec. 3, 2001, which claims priority to Australian Patent Application No. PR1878 filed on Dec. 4, 2000. All publications, patents, patent applications, databases and other references cited in this application, all related applications referenced herein, and all references cited herein, are expressly incorporated herein by reference in their entirety as if restated herein in full and as if each individual publication, patent, patent application, database or other reference were specifically and individually indicated to be incorporated by reference.

FIELD OF THE INVENTION

The present invention relates generally to monitoring systems and, in particular, concerns a device, method and system for monitoring the status of a circuit. The device is especially useful in security management systems, fire systems and building management systems, and it will therefore be convenient to describe the invention in relation to those example applications. It should be understood, however, that the invention is intended for a broader application and use.

BACKGROUND

Security management systems are typically employed in correctional facilities, such as prisons, as well as buildings intended for other purposes where restricted access is required. Some examples of such systems include those sold under the names Pagasus, Card key and Access. In general, these systems are proprietary, and components from one system will not work with components from another system. Additionally, any modifications to the hardware or software must generally be made by the original manufacturer.

In a typical prior art security management system (SMS) a number of field devices, perhaps several hundred or even thousands, are wired back via various circuits to a centralised SMS control unit. Typical field devices include infra-red motion detectors, read switches on doors and windows, glass breakage tapes on windows, smoke or heat detectors and tamper switches. Each of these field devices includes a switchable element which is triggered when an abnormal or specified condition occurs, for example a read switch detects when a door is opened, an infra-red motion detector senses movement or a smoke detector senses smoke in the air. The switchable element may be a normally open contact (ie., it closes when triggered) or it may be a normally closed contact (ie., it opens when triggered).

In general, a first resistive component is connected in series with the switchable element and a second resistive component, referred to herein as a field resistor, is connected in parallel with the switchable element. The field resistor is typically connected across the terminal block of the field device at the time of installation. If more than one field device is connected within a particular circuit, the switchable element of each of those devices is connected in parallel with the field resistor. In this configuration, the field resistor is usually connected across the switchable element of the last field device on a line extending from the SMS control unit.

FIG. 1 shows a typical example of a single line circuit connected to a switchable element SW1 of a single field device. The circuit includes a first resistive component R1 in series with the switchable element SW1 and a second resistive component R2 (field resistor) in parallel with the switchable element SW1. Several field devices may be connected to this circuit and, in that event, the switchable elements of those field devices would be connected in parallel with the field resistor R2. In practice, the field resistor R2 would be connected to the field device farthest from the input terminals 1, 2 of the SMS control unit.

On considering the circuit shown in FIG. 1, it will be appreciated that the line resistance measurable at input terminals 1, 2 of the SMS control unit will change when the switch SW1 closes. With the switch SW1 in the open position the line resistance will be R1 plus R2. With the switch SW1 in the closed position the line resistance will be R1 alone. The SMS control unit determines the status of the switch SW1 (opened or closed) by continuously measuring the circuit resistance of the line connected to its input terminals 1, 2.

Each manufacturer of SMS equipment specifies a particular value of field resistor to be connected across the last field device in a line. Typical values may be 2 k.OMEGA., 4.7 k.OMEGA, or 10 k.OMEGA. The resistance of the cable itself is in general insignificant in comparison to the values of the resistive components R1 and R2 involved in the circuit. In many applications, the series resistor R1 is the same value as the field resistor R2. In any particular installation, wherein all lines are connected to a single SMS control unit, the field resistor R2 for each line of the system in the same value.

The various field devices in a particular installation are often supplied by other manufacturers and those devices can generally be used with any SMS control unit. This is because the field devices merely contain a switching element and the field resistor is connected during installation of the system. In some cases however, the supplier of the SMS control unit may also supply field devices and, in those cases, the field resistor may be hard wired within the device, rather than being externally wired across the terminal block at the time of installation. In that event, the field devices can only be used with the same brand of SMS control unit.

These factors cause a few problems when the owner of an SMS system needs to upgrade or modify its system. Because each line connected to the system includes a field resistor of a particular value, the owner is forced to return to the original supplier of the SMS in order to provide an upgrade. Alternatively, the system owner must rewire each of the lines connected to the system and replace the field resistor with a different value, as specified by the supplier of the new SMS control unit. Where the resistor is built into the field device it cannot be changed and the system owner is forced to also replace each of the devices if it wants to change to a different brand of SMS control unit.

Typical SMS systems include an operator interface providing a graphical representation of the system being monitored and controlled. The software employed in the interface is proprietary and cannot be changed by the user. Any modification to the operator interface thus needs to be made by the original supplier and this makes the owner vulnerable to excessive ongoing maintenance costs by the supplier.

In an attempt to remove this dependency on the original supplier, the present inventor has in the past developed a universal replacement for a proprietary SMS system using a standard programmable logic controller (PLC) and analog input cards. This provided a flexible solution which could be programmed to cater for a wide variety of field resistor values. Any PLC could be used to replace the proprietary system without having to change the field resistors, thus saving considerable installation time. The programming of the PLC is more time-consuming, because all processing is done within the central processor of the PLC and this needs to be programmed using conventional ladder logic, but overall installation time is reduced. The main problem with this approach in a commercial installation, however, is the high cost of analog input cards for commercially available PLCs. The cost of these cards makes this form of PLC-based SMS prohibitively expensive for large installations.

There therefore remains a need for a flexible system which can reproduce the function of a security management system, or similar systems, or which can be used in conjunction with standard and commonly available hardware and software to provide the necessary functionality.

SUMMARY OF THE INVENTION

The present invention accordingly provides a device for monitoring the status of a circuit based on a measurable parameter of the circuit, the device including:

measurement means for measuring the parameter of the circuit;

comparison means for comparing the measured parameter to at least one threshold value and for assigning a status based on the result of the comparison; and output means for presenting an indication of the assigned status.

This device may be used to measure the electrical resistance of a circuit and, based on that measurement, provide the functionality of a traditional security management system.

In one embodiment, the circuit is an electrical circuit containing at least one switchable element. This switchable element may be incorporated within a field device of the type described above. The circuit includes a first resistive component in series with the switchable element and a second resistive component in parallel with the switchable element such that the status of the switchable element is reflected in the circuit resistance.

In one embodiment the threshold value is adjustable by a user. In this way, the device is able to cater for a wide variety of values of the first and second resistive components. This enables the device to be retrofitted to existing SMS systems, wherein the resistors may have been installed many years earlier and may not be readily accessible for replacement.

Preferably, the comparison means includes a plurality of threshold values for assigning a corresponding plurality of status conditions. In one embodiment, the plurality of status conditions includes the following:

short circuit,
alarm 2,
normal,
alarm 1, and
open circuit.

The device preferably also includes communication means for communicating the status to a monitoring system. The communication means preferably employs an open communication standard such as the DeviceNet™ open network standard developed by the Open DeviceNet Vendor Association Inc. DeviceNet™ is a low cost communications link used to connect industrial devices (such as limit switches, photo electric sensors, process sensors, panel displays and operator interfaces) to a network and eliminate expensive hard wiring. The direct connectivity provides improved communication between devices as well as important device-level diagnostics not easily accessible or available through hard wired I/O interfaces. DeviceNet™ is a simple, networking solution that reduces the cost and time to wire and install industrial automation devices, while providing interchangeability of "like" components from multiple vendors. A description of the DeviceNet™ standard can be found in the July 2000 DeviceNet™. Product Catalogue by Open Vendor Association, Inc. This Produce Catalog is incorporated herein by cross-reference.

Another aspect of the present invention provides a security management system incorporating a circuit monitoring device of the type described above. Such a system may utilise standard programmable logic controller hardware together with standard operator interface software to provide a fully functional security management system. The circuit monitoring device may be in the form of a separate module which is connected to the PLC using a communications module based on the DeviceNet™ standard, or other suitable open communication standard. Alternatively, the circuit monitoring device may be configured as a plug-in card which connects directly to the back plane of the PLC. In this form, different versions of the circuit monitoring device would need to be made to plug in to different brands of PLC. A separate DeviceNet™ module thus has the advantage that it can be used with any brand of PLC.

A major advantage of the present invention is that it allows the retrofit of existing security management systems, fire systems and building management systems, while utilising the existing circuit wiring regardless of existing resistance values. Retrofits and new installations may use various PLCs and operator interfaces, and a variety of hardware and software, instead of being locked into proprietary hardware and software.

As a further alternative, the circuit monitoring device may be built into a card which is adapted to plug directly into a personal computer or similar device.

BRIEF DESCRIPTION OF THE DRAWINGS

Preferred embodiments of the present invention will now be described with reference to the accompanying drawings. In the drawings.

DETAILED DESCRIPTION OF THE PREFERRED EMBODIMENTS

Figure 2:
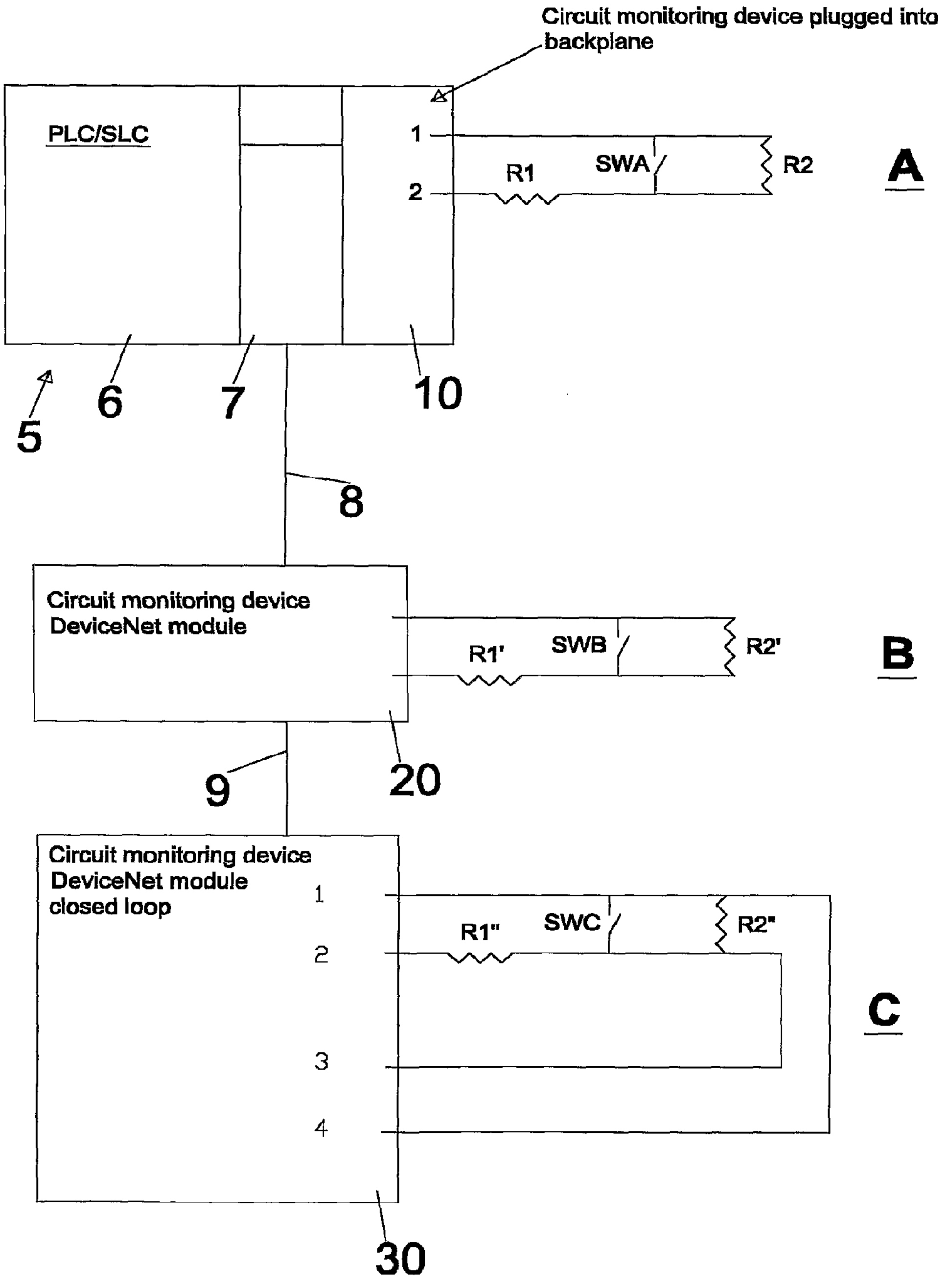
FIG. 2 shows a monitoring system-incorporating three embodiments of the circuit monitoring device of the present invention.

FIG. 2 of the drawings shows an example application of the circuit monitoring device of the present invention. In this application a number of circuit monitoring devices are used in a security management system (SMS) to monitor the status of various circuits containing field devices such as motion detectors, read switches on doors and windows, smoke detectors, etc. In particular, a centralised SMS control unit 5 communicates with three monitoring devices 10, 20 and 30 to monitor three individual electrical circuits labelled generally as A, B and C in FIG. 2 respectively.

The SMS control unit 5 includes a conventional programmable logic controller (PLC) such as an Allen Bradley model SLC 505 produced by Rockwell Automation, or any other suitable model produced by another manufacturer such as Siemens, Omron, Mitsubishi, etc. The PLC includes a microprocessor card 6 and may include various input and output cards or communications cards.

Circuit A includes a switchable element SWA associated with a field device (eg. an infra-red motion detector), a first resistive component R1 in series with the switchable element SWA and a second resistive component R2 in parallel with the switchable element SWA. The second resistive component R2 is typically wired across the terminal block of the field device at the time of installation and is often referred to as a field resistor.

In this application, the circuit monitoring device 10 may be called an "end-of-line "resistance module (EOL module) because it measures the end-of-line resistance of circuit A. It is thus convenient to hereinafter refer to the device 10 in this way.

Figure 1:
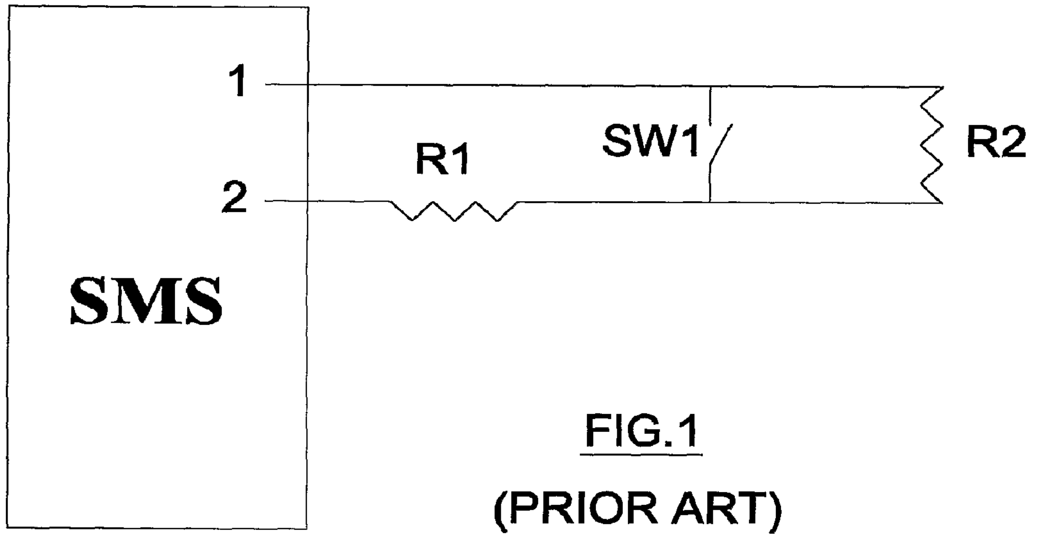
FIG.1 (PRIOR ART)
FIG. 1 shows a circuit in a prior art security management system.

Similar to the conventional circuit shown in FIG. 1, the end-of-line resistance of circuit A will change when the switchable element SWA closes or opens. The measured resistance may thus be used by EOL module 10 to determine whether the switch SWA is open or closed. Further, the EOL module 10 can determine the existence of a fault condition such as an open circuit (infinite resistance) or short circuit (very low resistance).

The EOL module 10 is configured electrically and mechanically to be plugged directly into the back plane of the PLC. This module may thus be produced as a form of plug-in card, similar to conventional digital and analog input and output cards. Communication between the microprocessor 6 of the PLC and the EOL module 10 is via the back plane of the PLC.

FIG. 2 also shows two remote EOL modules 20 and 30. A scanner module, being a communications card, is provided to enable communication with remote EOL modules 20 and 30.

EOL module 20 monitors the resistance of circuit B whilst EOL module 30 monitors the resistance of circuit C. Circuit B is identical to circuit A but the EOL module 20 is remote from the PLC. EOL module 20 employs the DeviceNet™ standard to communicate with the PLC via a communications link 8 and DeviceNet communications card 7 which is plugged into the back plane of the PLC.

EOL module 30 is a closed loop form of resistance module which measures the resistance of circuit C via inputs 1 and 2 and inputs 3 and 4. This circuit provides an extra level of security in the event that a section of the circuit fails due to an open or short circuit. The EOL module 30 also operates according to the DeviceNet™ standard and communicates with the communications card 7 of the PLC via communications links 8 and 9.

Figure 3:
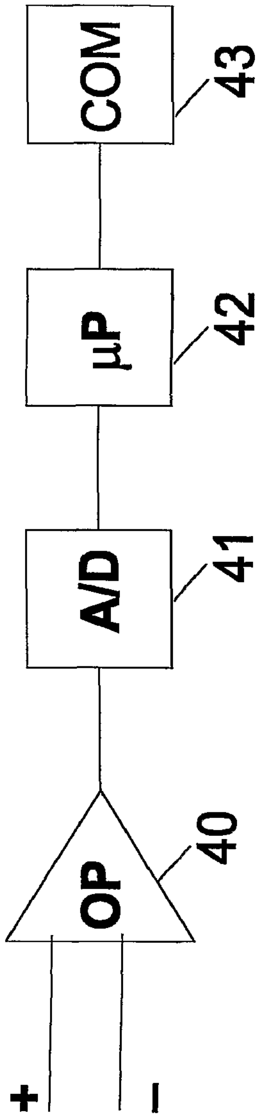
FIG. 3 shows a circuit block diagram for one input of the circuit monitoring device of the present invention.

FIG. 3 shows an example input circuit as may be used within any one of the EOL modules 10, 20 or 30. The input circuit includes an operational amplifier (OPAMP) 40, an analog to digital converter 41 (A/D converter), a microprocessor 42 and a communication module 43. A field circuit, for example circuit A, B or C of FIG. 2, is connected to the input of the OPAMP 40. An analog output of the OPAMP 40 is converted by the A/D converter 41 to a count value representing its analog input. This count value is then a numerical representation of the end-of-line resistance of the field circuit. The microprocessor 42 compares the value of the measured resistance with various thresholds to determine the status of the field circuit, and of any switchable element within the field circuit. The result of this comparison is communicated to a centralised monitoring system such as the SMS control unit 5 shown in FIG. 2.

In the EOL module 10 (FIG. 2) the communication module 43 is adapted for communication across the back plane of the PLC to the microprocessor 6. In EOL modules 20 and 30 (FIG. 2) the communication module 43 is a DeviceNet™ communication module implementing the DeviceNet™ communication standard.

For the sake of simplicity, FIG. 3 shows a single field circuit connected to a single A/D converter, microprocessor and communications module. However, in practice, an EOL module would include multiple inputs, for example, 8 or 16. In the case of a 16 input EOL module, sixteen OPAMP may be used and these may be connected respectively to 16 A/D converters. However, the outputs from the sixteen OPAMPS may alternatively be multiplexed to a single A/D converter. A single microprocessor may be used to read each of the digital resistance values to determine a status condition for each of the field circuits.

Figure 7:
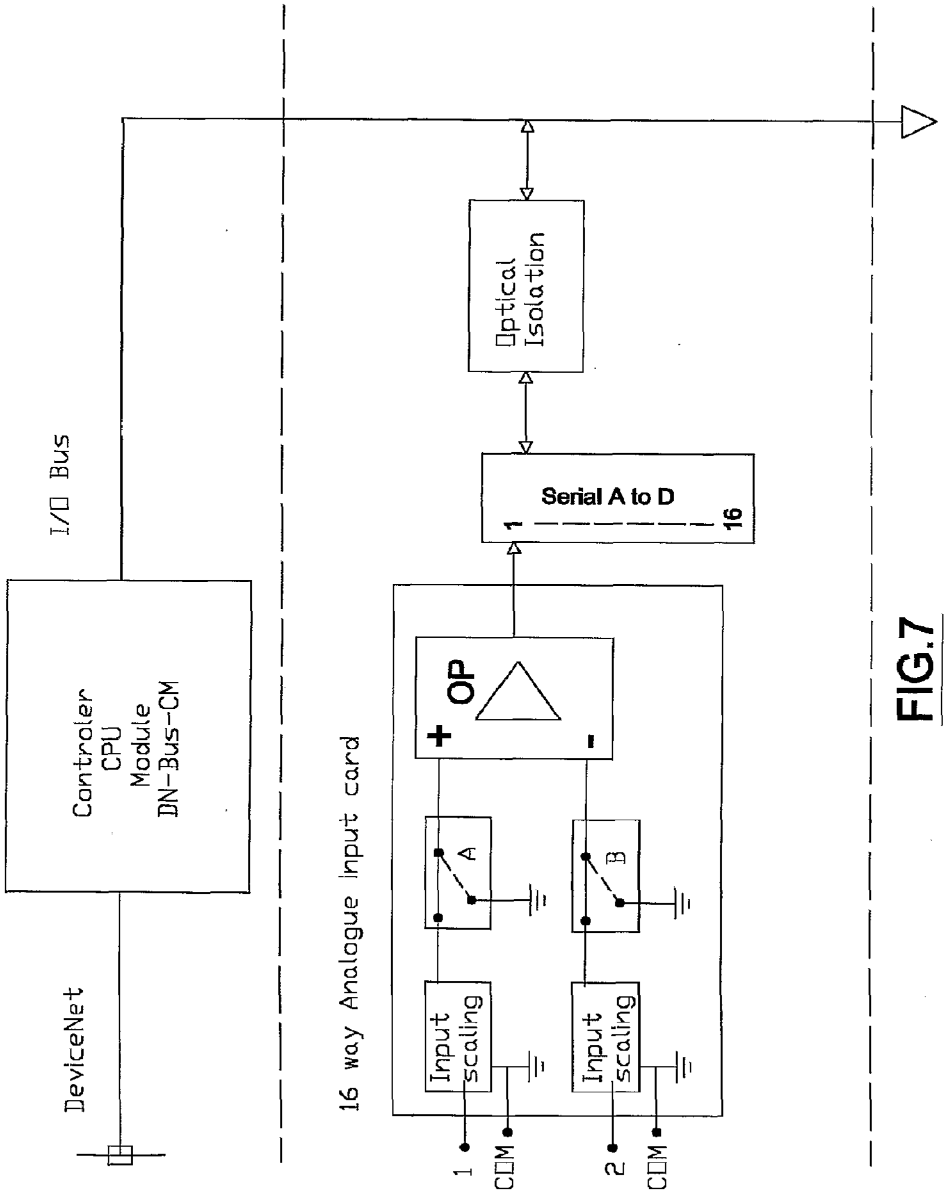
FIG. 7 shows a circuit diagram for a prototype circuit monitoring device in accordance with one embodiment of the present invention.

FIG. 7 shows a circuit diagram for a prototype circuit monitoring device. The device provides for eight input circuits connected to an eight channel analog to digital converter. This is connected via an I/O bus to a central processing unit (CPU) which is in turn connected to a DeviceNet™ communication module.

Figure 4:
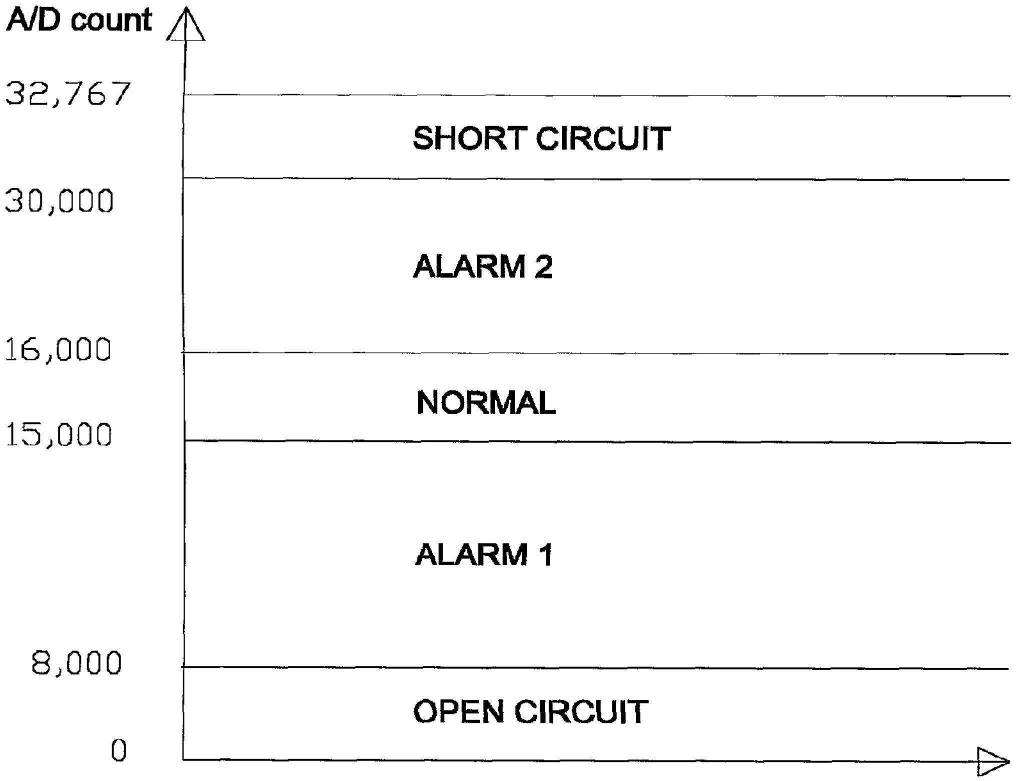
FIG. 4 shows a diagrammatic representation of comparisons made to determine status conditions according to the present invention.

FIG. 4 shows a diagrammatic representation of the comparisons made by the microprocessor 42 (FIG. 3) for a field circuit. This example assumes that the EOL module uses a 16 bit A/D converter. Such a converter produces a count value ranging from 0 to 32,767. This count represents the measured end-of-line resistance of the field circuit. The count is compared to various thresholds, as shown, to determine a status condition for the field circuit. If the count is below 8,000, an Open Circuit condition is assigned. If the count is above 30,000, a Short Circuit condition is assigned. A value between 15,000 and 16,000 is considered to be the normal operational range for the circuit, and a Normal condition is assigned. Values between 8,000 and 15,000 are assigned an Alarm 1 condition whilst values between 16,000 and 30,000 are assigned a Alarm 2 condition.

Referring now to circuit A in FIG. 2, and assuming that switch SWA is a normally open switch, one would expect the normal end-of-line resistance of the circuit to be equal to the values of R1 plus R2. This resistance value would produce a count between 15,000 and 16,000 in FIG. 4. A range of count values are specified in order to allow for variations in the circuit resistance resulting from cable resistance and connections. Some variation would clearly occur depending on the length of the cable extending to the field devices and the cross-sectional area of those cables. When the switch SWA closes, the end-of-line resistance would drop to the value of R1 alone. In FIG. 4, this would produce a Alarm 2 condition. Alternatively, if the switch SWA was instead a normally closed, that condition would be considered "normal" and opening the switch SWA would result in an increase in the end-of-line resistance to the value of R1 plus R2. This would produce an Alarm 1 condition in FIG. 4. Thus, what is considered "normal" depends on the type of switchable element used in the field circuit. It will also be appreciated that the definition of High and Low in FIG. 4 could be reversed compared to the scenario just described.

The EOL module 10 can also detect the presence of a fault condition, such as an open circuit or a short circuit. In the case of a short circuit, the end-of-line resistance drops to a very low value, depending upon the resistance of the cable and the location along the cable of the short circuit. In the case of an open circuit, the resistance increases to a very high value, dependent upon the resistance of the insulation of the cable. A range of values is thus used to allow for such variations.

It is considered that appropriate software for the microprocessor 42 shown in FIG. 3 may be written by any skilled computer programmer and, accordingly, need not be described herein in detail. The language used may be a high level language or a low level machine language appropriate to the particular microprocessor used in the EOL module.

The various threshold values shown in FIG. 4 at 8,000, 15,000, 16,000 and 30,000 are preferably configured as variables which may be set as parameters of the EOL module. In this way, the EOL module may be configured to operate with a wide range of field resistors, thus enabling the EOL module to be retrofitted to a wide range of field circuits wherein the series and field resistors (R1, R2 respectively) already exist and cannot readily be changed.

After comparing the measured resistance to each of the threshold values the microprocessor 41 (FIG. 3) produces, as an output, an indication of the status of the field circuit, eg. circuit A, B or C in FIG. 2. This output may be in the form of individual flags or bits which are set when a particular status condition is assigned and thus has only two possible values from each comparison. For example, five output bits may represent five possible status conditions, namely Short Circuit, Alarm 2, Normal, Alarm 1 and Open Circuit.

Thus, in accordance with an embodiment of the invention, the EOL module measures the end-of-line resistance of the field circuit, compares the measured resistance to a number of threshold values and assigns a status based on the result of the comparison. This status is then presented as an output in the form of five digital bits which then can be read by or transmitted to a centralised monitoring system. This centralised system does not need to concern itself with the actual value of the end-of-line resistance for the circuit but merely with the determined status of the circuit. This is significant because merely a few bits of information needs to be transferred, rather than a whole word representing the analog value. In FIG. 2, the microprocessor 6 of the PLC merely needs to read 5 flags or bits from EOL module 20, via the communications module 7. The microprocessor 6 is not concerned with, and is not even aware of, the actual end-of-line resistance of the circuit B which is connected to the EOL module 20. The communications module 7, being a conventional scanner module produced by the manufacturer of the PLC equipment, scans the EOL module 20 using conventional DeviceNet™ standards.

To configure a particular EOL module, such as a module 20 in FIG. 2, the threshold values are controlled by software at the module level. For example, using software called RS Networks (Rockwell Software Networks) produced by Rockwell Automation, it is possible to access any particular module connected to the PLC network. The RS Networks software displays the parameters of each of those modules and the parameters can then be changed. In the present application, the threshold values (shown in FIG. 4) may be changed as parameters of the DeviceNet™ EOL module 20. Once the parameters are set, they are stored within the module 20, not the PLC, and are retained within non-volatile memory of that module.

In one form, the parameters may be set individually for each input of a multi-input module. However, more likely, the parameters would be identical for each input of the module and each, at least initially, would be set using the same parameters. Individual changes could be made after setting the default parameter for the whole module.

The EOL modules may also be programmed with default threshold values at the time of manufacture. For example, the threshold value may be set at levels appropriate for field circuits employing field resistors having a value of 4.7 k.OMEGA. In this way, the EOL module may be used in a PLC-based retrofit, for a conventional security management system which normally uses field resistors having a value of 4.7 k.OMEGA., without needing to program the EOL modules at all. If the system being replaced uses field resistors having a different value, then the EOL modules can be reprogrammed for that value.

Figure 5:
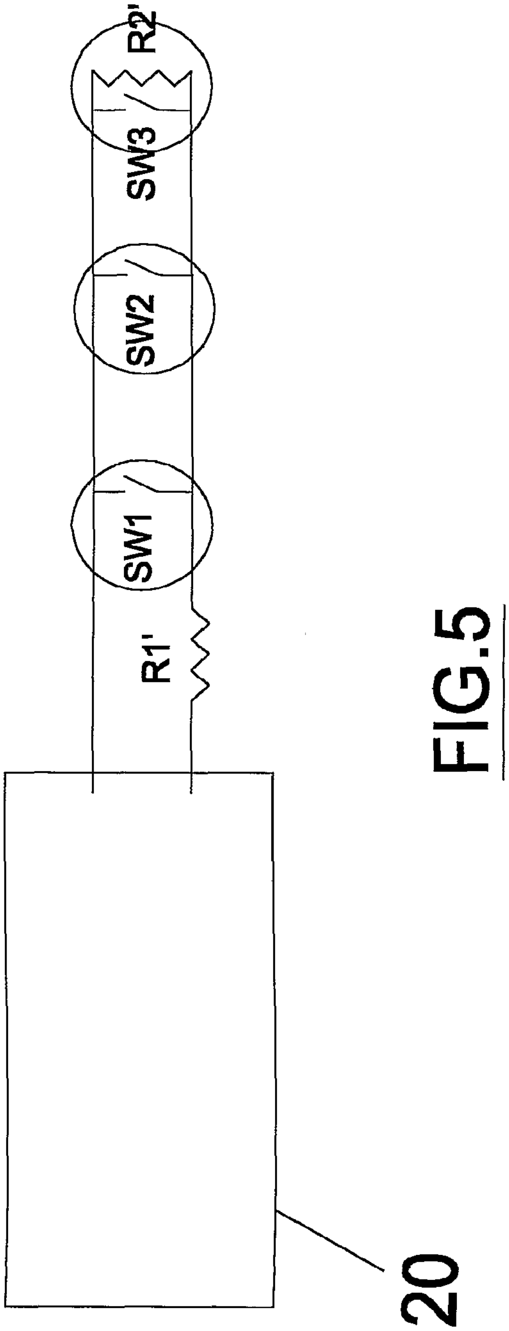
FIG. 5 shows a circuit diagram for an end of line resistance module.
Figure 6:
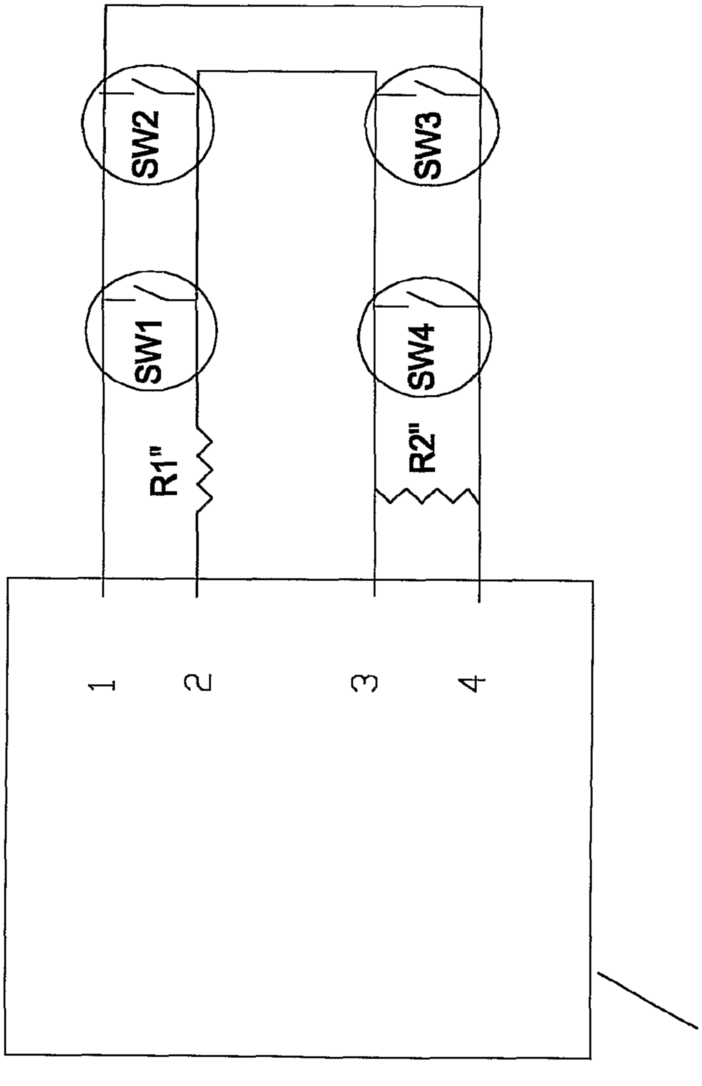
FIG. 6 shows a circuit diagram for a closed loop module.

FIGS. 5 and 6 show extended versions of circuits B and C in FIG. 2 respectively. In each of FIGS. 5 and 6 a number of field devices are connected within the circuit Like reference numerals are used in FIGS. 5 and 6 to represent like component in FIG. 2. The field devices may be smoke detectors, read switches or other forms of detector.

A PLC based security management system would preferably be provided with an operator interface in the form of a visual display unit and an input device, such as a computer keyboard. A visual representation of the system being monitored would be presented on the visual display. A number of standard Supervisory Control And Data Acquisition (SCADA) software packages are available which can be run on standard personal computer (PC) hardware. Some examples include FIX by intellution, Citec by CI Technologies. Alternatively, a customised user interface may be developed using graphical programming tools such as Active X, Visual Basic or Visual C++. The personal computer may be networked to one or more PLCs to provide an integrated security management system.

Similar PC and PLC hardware and software may be employed to create a fully functional fire system or building management system.

Such PC/PLC-based systems using EOL modules according to the present invention may be readily retrofitted to existing systems, while utilizing the existing circuit wiring regardless of existing resistance values. A system built in this way, either as an original installation or as a retrofit, provides a flexible and relatively inexpensive option which eliminates dependency on proprietary hardware and software.

A system employing the present invention provides various options including:

End-of-line resistance (as shown in FIG. 5);

Closed loop resistance (as shown in FIG. 6);

Dual redundancy, -end-of-line or closed loop (see below);

Intrinsically safe (see below).

Dual redundancy may be provided at various levels. For example, two communication lines may be provided between a communications scanner module in the PLC and a remote EOL module. If one of the lines fails, the other keeps going. Alternatively, or in addition, two scanner modules may be provided in the PLC. Further, two microprocessors may be provided within the PLC in critical application. Such dual redundant systems are typically required in specialized fire systems.

Intrinsically safe systems are often required in hazardous locations. This may be achieved by using an intrinsically safe barrier or module, which are commonly available, or by making the EOL module itself intrinsically safe. This saves on added wiring and additional hardware costs but would make the cost of the module itself somewhat greater.

Although preferred embodiments of the invention have been described herein in detail, it will be understood by those skilled in the art that variations may be made thereto without departing from the spirit of the invention or the scope of the amended claims. For example, the DeviceNet™ standard has been referred to herein for providing the communication link between a remote EOL module and a PLC communication scanner module. There are, however, various communication networks which may be just as efficient. Such variations to the described system are considered to fall well within the scope of the appended claims.

What is claimed is:

1. A circuit monitoring device, comprising:
one or more processors, each having a memory and an input electrically coupled to a circuit which is configured to receive a measured electrical parameter of the circuit, and modules comprising software to configure the one or more processors, the modules including:
a comparison module configured to compare a digital value, which corresponds to a magnitude of the measured electrical parameter, to a plurality of threshold values stored in the memory, wherein the plurality of threshold values define a respective plurality of ranges of digital values, each range corresponding to one of a plurality of conditions of the circuit including a normal condition and at least one alarm condition, and
assign a status based on the digital value being within a particular range defined by one or more of the plurality of threshold values,
a communication module configured to generate a status signal including at least the assigned status; and
a transmitter configured to transmit the status signal to a centralized system over a network for output, by the centralized system, of the status.

2. The device of claim 1, further comprising an analog to digital converter, wherein the analog to digital converter converts the measured electrical parameter from an analog value into the digital value.

3. The device of claim 2, wherein at least one of the one or more processors is configured by the comparison module to assign the status based on whether the count value of the measured electrical parameter is greater than or less than the plurality of threshold values.

4. The device of claim 2, wherein the plurality of threshold values are adjustable and at least two of the plurality of threshold values are pre-set to define at least one of the plurality of ranges.

5. The device of claim 4, wherein the status signal transmitted to the centralized system for output enables the display of an indication of at least the one of the plurality of conditions of the circuit which corresponds to the assigned status.

6. The device of claim 4, wherein the one or more processors are configured to receive settings from a user and define one or more of the plurality of threshold values according to the received settings.

7. The device of claim 1, wherein the plurality of threshold values are adjustable and at least two of the plurality of threshold values are pre-set to define at least one of the plurality of ranges.

8. The device of claim 1, wherein the status signal transmitted to the centralized system for output enables the display of an indication of at least the one of the plurality of conditions of the circuit which corresponds to the assigned status.

9. The device of claim 1, wherein at least one of the one or more processors is configured to receive settings from a user and define the at least one of the plurality of threshold values according to the received settings.

10. The device of claim 1, wherein at least one of the plurality of threshold values is adjustable and the at least one of the plurality of threshold values is pre-set to define at least one of the plurality of ranges.

11. The device of claim 10, wherein the status signal transmitted to the centralized system for output enables the display of an indication of at least the one of the plurality of conditions of the circuit which corresponds to the assigned status.

12. The device of claim 10, wherein at least one of the one or more processors is configured to receive settings from a user and define the one or more of the plurality of threshold values according to the received settings.

13. The device of claim 2, wherein at least one of the plurality of threshold values is adjustable and the at least one of the plurality of threshold values is pre-set to define at least one of the plurality of ranges.

14. The device of claim 13, wherein the status signal transmitted to the centralized system for output enables the display of an indication of at least the one of the plurality of conditions of the circuit which corresponds to the assigned status.

15. The device of claim 13, wherein at least one of the one or more processors is configured to receive settings from a user and define the one or more of the plurality of threshold values according to the received settings.

16. The device of claim 1, wherein the transmitter is configured to transmit to and receive signals from the centralized monitoring system over a network and according to one or more communication protocols.

17. The device of claim 1, wherein the transmitter is configured to transmit signals via one or more remote circuit monitoring devices over a network and according to one or more communication protocols.

18. A security management system, comprising:
at least one circuit monitoring device, each circuit monitoring device comprising:
one or more processors,
a memory,
an input electrically coupled to a circuit, and
a transmitter configured to transmit a status signal over a network;
wherein at least one of the one or more processors is configured to operate upon a measured electrical parameter of the circuit electrically coupled to the input via software included in modules, including:
a comparison module configured to
compare a digital value, which corresponds to the measured electrical parameter, to a plurality of threshold values stored in the memory, wherein the plurality of threshold values define a respective plurality of ranges of digital values, each range corresponding to one of a plurality of conditions of the circuit including a normal condition and at least one alarm condition, and
assign a status based on the digital value being within a particular range defined by one or more of the plurality of threshold values, and
a communication module configured to generate the status signal including at least the assigned status; and
a centralized monitoring system communicatively coupled to the at least one circuit monitoring device, the centralized monitoring system having one or more processors configured via software included in modules, including,
a central communication module, configured to receive the status signal including the assigned status from the at least one circuit monitoring device over the network, and a monitoring module configured to output the assigned status on a display.

19. The system of claim 18, further comprising an analog to digital converter, wherein the analog to digital converter converts the measured electrical parameter from an analog value into the digital value.

20. The system of claim 19, wherein at least one of the one or more processors of the at least one circuit monitoring device is configured by the comparison module to assign the status based on whether the digital value of the measured electrical parameter is greater than or less than the plurality of threshold values.

21. The system of claim 19, wherein the plurality of threshold values are adjustable and at least two of the plurality of threshold values are pre-set to define at least one of the plurality of ranges.

22. The system of claim 21, wherein at least one of the one or more processors of the at least one circuit monitoring device is configured to receive settings from a user and define one or more of the plurality of threshold values according to the received settings.

23. The system of claim 18, wherein the plurality of threshold values are adjustable and at least two of the plurality of threshold values are pre-set to define at least one of the plurality of ranges.

24. The system of claim 23, wherein at least one of the one or more processors of the at least one circuit monitoring device is configured to receive settings from a user and define at least one of the plurality of threshold values according to the received settings.

25. The system of claim 18, wherein at least one of the plurality of threshold values is adjustable and the at least one of the plurality of threshold values is pre-set to define at least one of the plurality of ranges.

26. The system of claim 25, wherein at least one of the one or more processors of the at least one circuit monitoring device is configured to receive settings from a user and define the at least one of the plurality of threshold values according to the received settings.

27. The system of claim 19, wherein at least one of the plurality of threshold values is adjustable and the at least one of the plurality of threshold values is pre-set to define at least one of the plurality of ranges.

28. The system of claim 27, wherein at least one of the one or more processors is configured to receive settings from a user and define the at least one of the plurality of threshold values according to the received settings.

29. The system of claim 18, wherein each transmitter is configured to transmit to and receive signals from the centralized monitoring system over the network according to one or more communication protocols.

30. A method for monitoring a circuit using a circuit monitoring device, comprising:

receiving, using one or more processors configured by software within one or more modules, a parameter of a circuit;

comparing, using the one or more configured processors, a digital value, which corresponds to a magnitude of the parameter of the circuit, to a plurality of threshold values wherein the plurality of threshold values define a respective plurality of ranges of digital values, each range corresponding to one of a plurality of conditions of the circuit including a normal condition and at least one alarm condition;

assigning, using the one or more configured processors, a status according to the digital value being within a particular range defined by one or more of the plurality of threshold values; and transmitting, using a transmitter, the status to a central monitoring system.

31. The method of claim 30, further comprising the steps of:

measuring, across input terminals of the circuit, the parameter of the circuit as an analog value; and converting, using an analog to digital converter, the parameter from an analog value to the digital value.

32. The method of claim 31, wherein the comparing step compares the digital value provided by the converting step to the plurality of threshold values.

33. The method of claim 32, wherein the assigning step assigns the status according to whether the digital value of the parameter is greater than or less than the plurality of threshold values.

34. The method of claim 30, further comprising the step of user-adjusting the at least one of the plurality of threshold values to define at least one of the plurality of ranges.

35. The method of claim 30, further comprising the step of user-adjusting at least one of the plurality of threshold values to define at least one range of digital values, each range corresponding to at least one condition of the circuit, and wherein the comparing step compares the at least one range of digital values to the parameter.

36. The method of claim 30, further comprising the step of setting a default value for at least one of the plurality of threshold values to define at least one of the plurality of ranges.

37. The method of claim 30, wherein the step of transmitting the status to the central monitoring system enables the display of an indication of the status at the central monitoring system.

38. The method of claim 30, wherein the transmitting step transmits the status to the centralized monitoring system over a network and according to one or more communication protocols.

39. The method of claim 30, wherein the transmitting step transmits via one or more remote circuit monitoring devices over a network and according to one or more communication protocols.

* * * * *